(12) United States Patent
Foltin

(10) Patent No.: US 10,137,852 B2
(45) Date of Patent: Nov. 27, 2018

(54) METHOD AND DEVICE FOR MONITORING A PASSENGER COMPARTMENT OF A VEHICLE

(71) Applicant: Robert Bosch GmbH, Stuttgart (DE)

(72) Inventor: Johannes Ludwig Foltin, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/682,052

(22) Filed: Aug. 21, 2017

(65) Prior Publication Data

US 2018/0072255 A1     Mar. 15, 2018

(30) Foreign Application Priority Data

Sep. 14, 2016  (DE) .................. 10 2016 217 480

(51) Int. Cl.
| | | |
|---|---|---|
| *G08B 13/26* | (2006.01) | |
| *B60R 21/015* | (2006.01) | |
| *G01S 13/74* | (2006.01) | |
| *B60N 2/00* | (2006.01) | |
| *G01S 13/04* | (2006.01) | |

(52) U.S. Cl.
CPC .. *B60R 21/01534* (2014.10); *B60R 21/01546* (2014.10); *B60R 21/01548* (2014.10); *G01S 13/74* (2013.01); *B60N 2/002* (2013.01); *G01S 13/04* (2013.01)

(58) Field of Classification Search
CPC .................. A61G 1/00; H04W 4/00
See application file for complete search history.

(56) References Cited

U.S. PATENT DOCUMENTS

| | | | | |
|---|---|---|---|---|
| 2008/0275616 | A1* | 11/2008 | Houten | B60R 22/48 701/70 |
| 2009/0132128 | A1* | 5/2009 | Marriott | B60R 22/48 701/45 |
| 2009/0201141 | A1* | 8/2009 | Teshome | B60R 22/48 340/457.1 |
| 2015/0145666 | A1* | 5/2015 | Sugawara | B60R 22/48 340/457.1 |

* cited by examiner

*Primary Examiner* — Shirley Lu
(74) *Attorney, Agent, or Firm* — Norton Rose Fulbright US LLP; Gerard Messina

(57) ABSTRACT

A method for monitoring a passenger compartment of a vehicle. The passenger compartment has at least one RFID transponder. A readout signal for reading out the RFID transponder is emitted in the method. In response to the emitting, a response signal of the RFID transponder is measured in order to obtain a measured value. Using the measured value, a degree of obscuration that represents an obscuration of the RFID transponder is ascertained in order to monitor the passenger compartment.

9 Claims, 5 Drawing Sheets

METHOD AND DEVICE FOR MONITORING A PASSENGER COMPARTMENT OF A VEHICLE

CROSS REFERENCE

The present application claims the benefit under 35 U.S.C. § 119 of German Patent Application No. DE 102016217480.0 filed on Sep. 14, 2016, which is expressly incorporated herein by reference in its entirety.

BACKGROUND INFORMATION

The present invention relates to a device, a method, and a computer program.

Modern vehicles may be equipped with a seatbelt warning system that is able to prompt vehicle passengers to put on the seatbelt as a function of a seat occupancy, for instance. Seat mats, which are able to measure the seat occupancy, may be used for this purpose. For example, the seat mats are able to distinguish between different groups of persons such as a baby, child or adult. Seatbelt buckle sensors may be used in addition. It is also possible to monitor a passenger compartment of the vehicle with the aid of a camera system in order to ascertain the seat occupancy, the type of passenger, or the strap-in status.

SUMMARY

In accordance with the present invention, a method is provided for monitoring a passenger compartment of a vehicle, a device that uses this method, and finally, a corresponding computer program. The measures described herein allow for advantageous further refinements and improvements of the device.

A method for monitoring a passenger compartment of a vehicle is provided, the passenger compartment having at least one RFID transponder, and the method including:

Emitting a readout signal for reading out the RFID transponder;

Measuring a response signal from the RFID transponder in response to the emitting in order to obtain a measured value; and Ascertaining a degree of obscuration, which represents an obscuration of the RFID transponder, utilizing the measured value in order to monitor the passenger compartment.

An RFID transponder may be understood as a passive or an active transponder. For example, the RFID transponder is able to be read out via a suitable read device for the emission of electromagnetic waves. The RFID transponder, for instance, may be developed to receive the readout signal, emitted by the read device in the form of the electromagnetic waves, via an antenna and to use the received energy to provide the read device with an identification number as a response signal, for example. This may be done by a modulated withdrawal of energy from the readout signal or by actively returning the response signal, for instance. The RFID transponder is realized as a passive transponder, in particular, i.e., without its own energy supply. This makes it possible to ensure high robustness and a cost-effective production of the RFID transponder as well as an integration of the RFID transponder at a variety of locations in the vehicle. For example, the RFID transponder may be integrated into a seat, a seatbelt or a seatbelt buckle, in particular into a tab of the seatbelt buckle. The RFID transponder may be secured on the seatbelt in such a way, for instance, that the RFID transponder is obscured by a passenger compartment trim panel in the rolled-up state of the seatbelt. "Obscured" may be understood as shielding of the RFID transponder from the read device by a material that at least partially absorbs the readout signal or the response signal, in particular by a vehicle passenger. Here, the degree of obscuration may correspond to damping of the readout signal or the response signal by the material, for example.

In accordance with the present invention, a passenger compartment of a vehicle is able to be monitored in an efficient and reliable manner by ascertaining an obscuration of at least one RFID transponder located inside the passenger compartment. For example, the RFID transponder may be obscured by a passenger compartment trim panel of the vehicle or by vehicle passengers. Analyzing the communication status of the RFID transponder allows for an uncomplicated monitoring of the vehicle passenger compartment. For instance, the obscuration of the RFID transponder may be utilized to evaluate information in connection with the passenger protection, such as the seatbelt status, the seat occupancy or the seatbelt pullout length, or it may be used to classify persons for the purpose of dividing vehicle passengers into groups or sizes. Such an evaluation of the lack or the availability of status information of the RFID transponder has the advantage of allowing reliable monitoring of the vehicle passenger compartment even in low-contrast situations.

According to a specific embodiment, in the step of ascertaining, the degree of obscuration may be greater than zero if the measured value represents an absence of the response signal. Additionally or alternatively, the degree of obscuration may be equal to zero if the measured value represents a presence of the response signal. In this way it is possible to reliably ascertain the obscuration of the RFID transponder at a low computational outlay.

According to another specific embodiment, the present method may include a step of comparing the measured value with a reference value. In the process, in the step of ascertaining, the degree of obscuration is able to be ascertained as a function of a result of the comparison. For example, the degree of obscuration may be greater than zero if the measured value is less than or equal to the reference value, or it may be equal to zero if the measured value is greater than the reference value. In this manner the degree of obscuration is able to be ascertained in an especially precise manner.

According to a further specific embodiment, in the step of emitting, a transmission power for the emission of the readout signal is able to be varied as a function of a position of the RFID transponder in the vehicle passenger compartment or, additionally or alternatively, as a function of damping of the readout signal or the response signal or of both signals. This makes it possible to adapt the readout signal to different environmental conditions of the RFID transponder.

It is advantageous if in a step of generating a control signal is generated for controlling the vehicle, a protection device or, additionally or alternatively, if a warning signal is generated for the output of a warning in the vehicle passenger compartment with the aid of the degree of obscuration. The control signal, for example, may be generated in order to actuate a passenger protection system or the protection means of the vehicle. For example, the warning signal may be generated in order to warn a vehicle passenger who is not strapped in. This specific embodiment is able to increase the safety of the vehicle passengers.

In addition, in a step of determining, a seat occupancy in the vehicle passenger compartment, a size of a vehicle passenger, a pullout length of a seatbelt, or a status of a seatbelt buckle of a seatbelt of the vehicle is able to be determined with the aid of the degree of obscuration. This allows for exact monitoring of the vehicle passenger compartment.

According to a further specific embodiment, in the step of emitting, at least one further readout signal for reading out at least one additional RFID transponder in the vehicle passenger compartment is able to be output. In the step of measuring, in response to the outputting of the further readout signal, at least one additional response signal from the further RFID transponder may be measured in order to obtain at least one further measured value. Accordingly, in the step of ascertaining, an additional degree of obscuration that represents an obscuration of the additional RFID transponder is able to be ascertained using the additional measured value. In the process, the seat occupancy, the size of the vehicle passenger, the pullout length of the seatbelt or the status of the seatbelt buckle may furthermore be determined with the aid of the further degree of obscuration in the step of ascertaining. This makes it possible to increase the reliability of the method.

It is also advantageous if the measured value is plausibilized with the aid of the additional measured value in a step of plausibilizing, thereby making it possible to avoid measuring errors.

This method, for example, may be implemented in the form of software or hardware or in a mixed form of software and hardware, e.g., in a control unit.

The approach introduced here furthermore provides a device that is designed to execute, actuate or implement the steps of a variant of a method introduced here in corresponding devices. This embodiment variant of the present invention in the form of a device is likewise able to achieve the objective on which the present invention is based in a rapid and efficient manner.

To do so, the device may include at least one arithmetic unit for processing signals or data, at least one memory unit for storing signals or data, at least one interface to a sensor or to an actuator for reading in sensor signals from the sensor or for outputting data or control signals to the actuator, and/or at least one communications interface for reading in or outputting data that are embedded in a communications protocol. For example, the arithmetic unit may be a signal processor, a microcontroller or the like, and the memory unit may be a flash memory, an EPROM, or a magnetic memory unit. The communications interface may be designed to read in or output data in a wireless and/or a line-conducted manner. A communications interface that is able to read in or output the line-conducted data may read in these data, e.g., electrically or optically, from a corresponding data-transmission line or may output it to a corresponding data transmission line.

A device may here be understood as an electrical device that processes sensor signals and outputs control and/or data signals as a function thereof. The device may have an interface that is able to be developed in hardware and/or software form. In a hardware development, for instance, the interfaces may be part of a system ASIC which includes a wide variety of functions of the device. However, it is also possible for the interfaces to be discrete, integrated switching circuits or to be at least partially made up of discrete components. In the case of a software development, the interfaces may be software modules that are provided on a microcontroller in addition to other software modules, for example.

In an advantageous further refinement, the device carries out a control of the vehicle. For example, the device may access sensor signals such as acceleration, pressure, steering-angle or environmental sensor signals for this purpose. The actuation takes place via actuators, such as brake or steering actuators, actuators in the vehicle passenger compartment for adjusting seats and/or seatbelts and/or head rests or for adjusting airbag parameters, or via an engine control unit of the vehicle. A control of a vehicle may also include the adaptation and/or control of the protection devices that are part of the vehicle.

Also advantageous is a computer program product or a computer program having program code that may be stored on a machine-readable carrier or a memory medium such as a semiconductor memory, a hard disk memory or an optical memory, and which is used for executing, implementing and/or actuating the steps of the present method as recited in one of the afore-described specific embodiments, in particular when the program product or the program is executed on a computer or a device.

Exemplary embodiments of the present invention are shown in the figures and explained in greater detail below.

DETAILED DESCRIPTION OF EXAMPLE EMBODIMENTS

Figure 1:
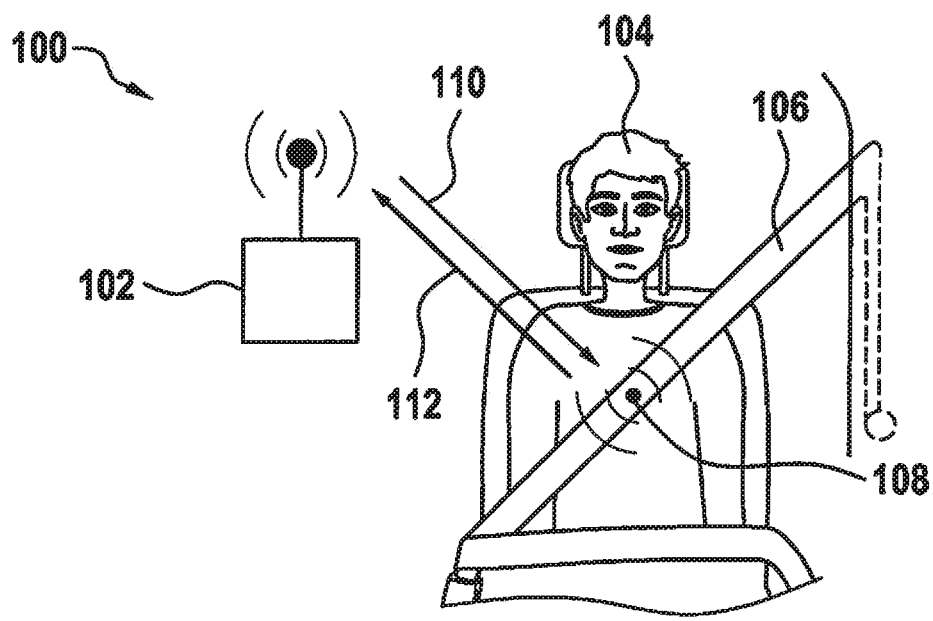
FIG. 1 shows a schematic illustration of a vehicle passenger compartment including a device according to an exemplary embodiment.

In the following description of advantageous exemplary embodiments of the present invention, the same or similar reference numerals are used for the elements shown in the various figures that have a similar effect, and a repeated description of these elements has been dispensed with.

FIG. 1 shows a schematic representation of a vehicle passenger compartment 100 having a device 102 according to an exemplary embodiment. Shown is a passenger 104 who is seated in vehicle passenger compartment 100 and is strapped in by a seatbelt 106. An RFID transponder 108 is fixed in place on seatbelt 106. Device 102, which is situated inside vehicle passenger compartment 100, for example, is used as a read device for reading out RFID transponder 108. Device 102 emits a readout signal 110 for this purpose. RFID transponder 108 is designed to receive readout signal 110 and to transmit a response signal 112 back to device 102 using readout signal 110. With the aid of response signal 112, device 102 ascertains whether or not RFID transponder 108 is obscured. In FIG. 1, seatbelt 106 is pulled out so that a communication is possible between RFID transponder 108 and device 102. Depending on the obscuration, device 102 ascertains a seatbelt rollout length of seatbelt 106, for example.

Figure 2:
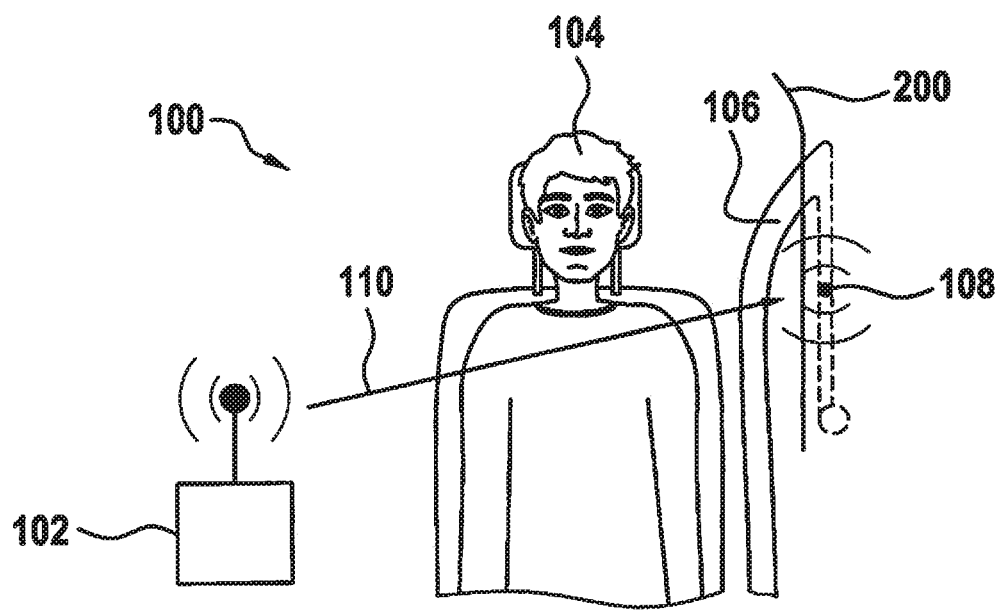
FIG. 2 shows a schematic illustration of a vehicle passenger compartment from FIG. 1.

FIG. 2 shows a schematic representation of a vehicle passenger compartment 100 from FIG. 1. In contrast to FIG. 1, vehicle passenger 104 is not strapped in by a seatbelt. RFID transponder 108 is secured on seatbelt 106 in such a way that RFID transponder 106 is situated behind passenger compartment trim panel 200 of vehicle passenger compartment 100 in the rolled-up state of seatbelt 106. Because of passenger-compartment trim panel 200 that obscures RFID transponder 106, the communication between RFID transponder 106 and device 102 is prevented, i.e. device 102 receives no response signal from RFID transponder 108 in reply to the emission of readout signal 110.

Depending on the placement of RFID transponder 108 inside vehicle passenger compartment 100, device 102, for example, is designed to ascertain a seat occupancy or also to ascertain a size of vehicle passenger 104 as a function of the obscuration of RFID transponder 108, as will be described in greater detail in the following text on the basis of FIG. 3. To ascertain the seat occupancy, RFID transponder 108 is integrated into a seat in vehicle passenger compartment 100, for instance.

Figure 3:
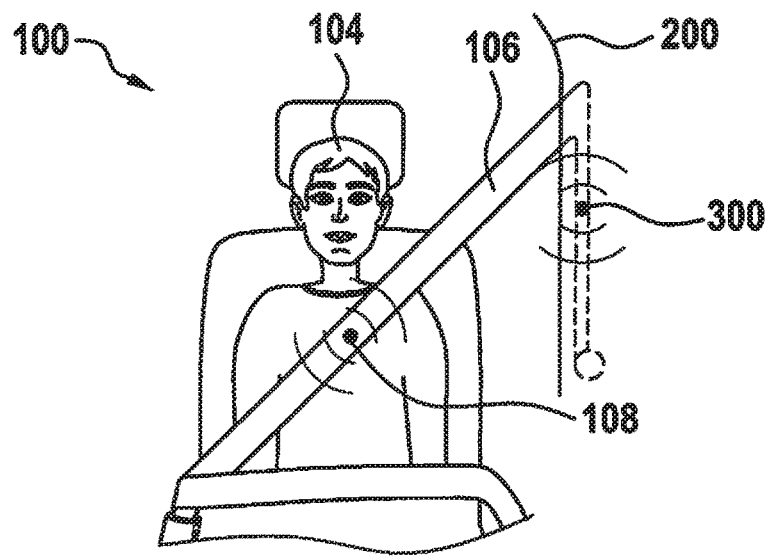
FIG. 3 shows a schematic illustration of a vehicle passenger compartment including a device according to an exemplary embodiment.

FIG. 3 shows a schematic representation of a vehicle passenger compartment 100 having a device 102 according to an exemplary embodiment. In contrast to FIGS. 1 and 2, seatbelt 106 includes a further RFID transponder 300 in addition to RFID transponder 108. Vehicle passenger 104, for instance, is a relatively small person, which means that RFID transponder 108 lies exposed in the strapped-in state of vehicle passenger 104, while further RFID transponder 300 is obscured by the passenger-compartment trim panel 200.

Figure 4:
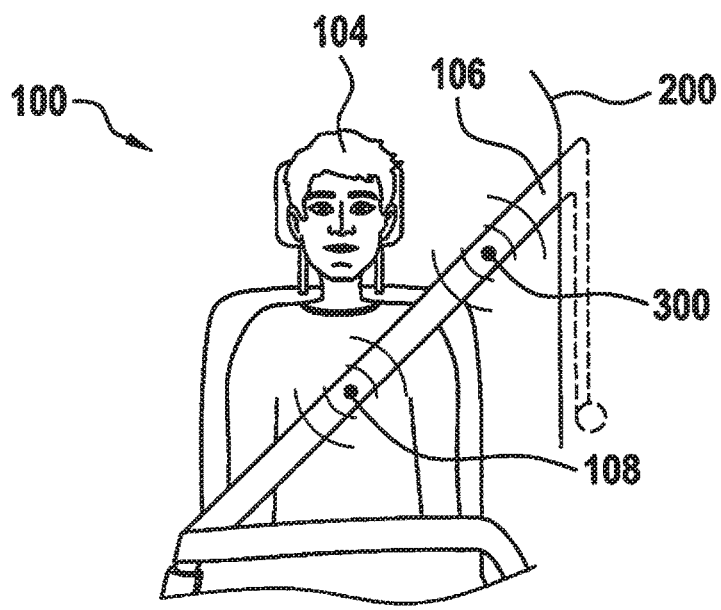
FIG. 4 shows a schematic illustration of a vehicle passenger compartment from FIG. 3.

FIG. 4 shows a schematic illustration of a vehicle passenger compartment 100 from FIG. 3. Vehicle passenger 104 here represents a clearly larger person than in FIG. 3. Accordingly, seatbelt 106 is rolled out further in the strapped-in state of vehicle passenger 104, so that both RFID transponders 108, 300 are exposed and are able to be read out by the device.

For example, the device ascertains a low seatbelt pullout if only one of the two RFID transponders is obscured, as illustrated in FIG. 3. Thus, it may be inferred that vehicle passenger 104 is a small person such as a child. On the other hand, if the device detects a great pullout, such as when the response signals of both RFID transponders 108, 300 are able to be received, as shown in FIG. 4, then a larger person may be correspondingly inferred.

Figure 5:
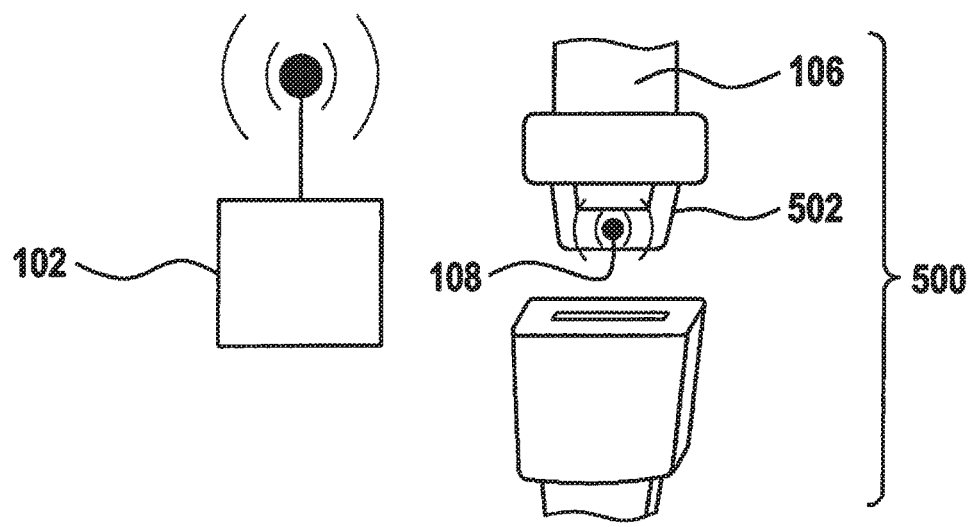
FIG. 5 shows a schematic representation of a seatbelt buckle provided with an integrated RFID transponder for use with a device according to an exemplary embodiment.

FIG. 5 shows a schematic representation of a seatbelt buckle 500 having an integrated RFID transponder 108 for use with a device 102 according to an exemplary embodiment. In contrast to FIGS. 1 through 4, RFID transponder 108 according to FIG. 5 is integrated into seatbelt buckle 500 of seatbelt 106, i.e. into a tab 502 of belt buckle 500 in this instance. Depending on the measured response signal of RFID transponder 108, device 102 ascertains an open or locked state of seatbelt buckle 500, for example. In the open state of seatbelt buckle 500, which is shown in FIG. 5, RFID transponder 108 is exposed so that it is able to be read out by device 102.

Figure 6:
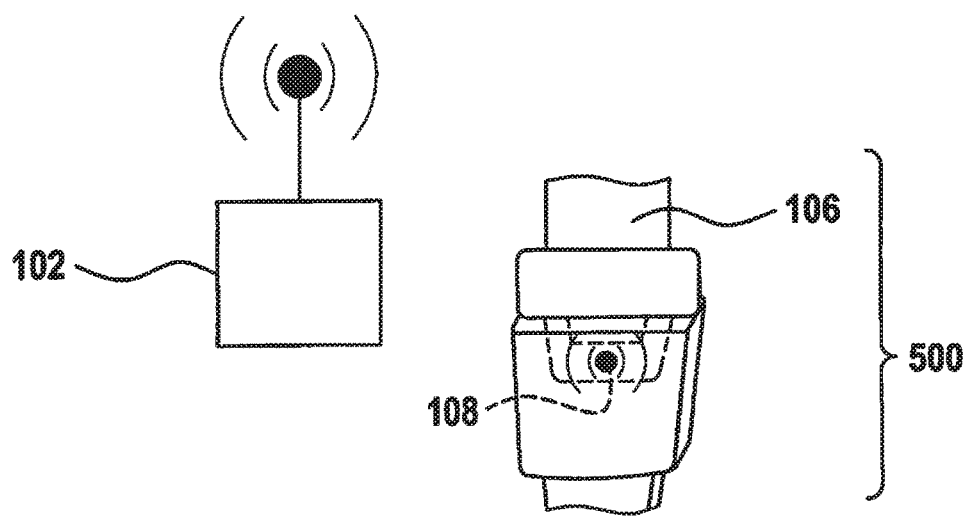
FIG. 6 shows a schematic representation of a seatbelt buckle from FIG. 5.

FIG. 6 shows a schematic representation of a seatbelt buckle 500 from FIG. 5. Seatbelt buckle 500 is shown in the locked state in this instance. RFID transponder 108 is obscured by seatbelt buckle 500. Device 102 therefore receives no signal response, or only a very weak signal response, from RFID transponder 108 in reply to the emitted readout signal.

Figure 7:
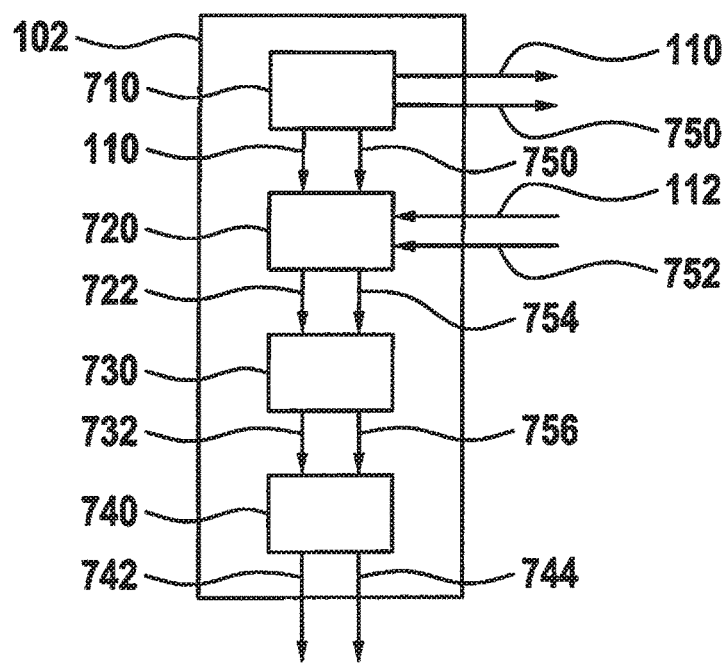
FIG. 7 shows a schematic representation of a device according to an exemplary embodiment.

FIG. 7 shows a schematic illustration of a device 102 according to an exemplary embodiment, such as a device as previously described with the aid of FIGS. 1 through 6. Device 102, also referred to as a read device, includes an emitting unit 710 for emitting readout signal 110. Readout signal 110 may also be referred to as a read pulse. A measuring unit 720 of device 102 is designed to measure response signal 112 in reply to the emitting of readout signal 110, and to forward a measured value 722 that represents response signal 112 to an ascertainment unit 730. Ascertainment unit 730 is developed to ascertain a degree of obscuration 732 that represents the obscuration of the RFID transponder, utilizing measured value 722 for this purpose.

According to an exemplary embodiment, ascertainment unit 730 ascertains a degree of obscuration 732 that is greater than zero if measured value 722 represents an absence of the response signal, i.e. when the response signal is so weak that it is no longer measurable by measuring unit 720, and/or if it lies below a reception strength or reference value. Analogously thereto, ascertainment unit 730 ascertains a degree of obscuration 732 that is equal to zero if measured value 720 represents a sufficiently strong response signal 112, i.e. a response signal that is measurable by measuring unit 720.

According to another exemplary embodiment, device 102 uses degree of obscuration 732 in order to generate a control signal 742 for controlling the vehicle or, additionally or alternatively, to generate a warning signal 744, for instance in order to prompt the vehicle passenger to put on the seatbelt in case this has not been done, these signals being generated in an optional generation unit 740.

Emitting unit 710 optionally outputs an additional readout signal 750 for reading out the additional RFID transponder. Measuring unit 720 here is designed to measure another response signal 752 of the additional RFID transponder in response to the emitting of further readout signal 750, and to forward an additional measured value 754, which represents additional response signal 752, to ascertainment unit 730. Ascertainment unit 730 analyzes additional measured value 754 in order to ascertain an additional degree of obscuration 756, which represents an obscuration of the additional RFID transponder. Accordingly, generation unit 740 is designed to generate control signal 742 or a warning signal 744 furthermore with the aid of additional degree of obscuration 756.

Depending on the exemplary embodiment, ascertainment unit 730 in particular is designed to ascertain a seat occupancy of the vehicle, the size of the vehicle passenger, the pullout length of the seatbelt, or also the state of the seatbelt buckle using the two degrees of obscuration 732, 756.

Figure 8:
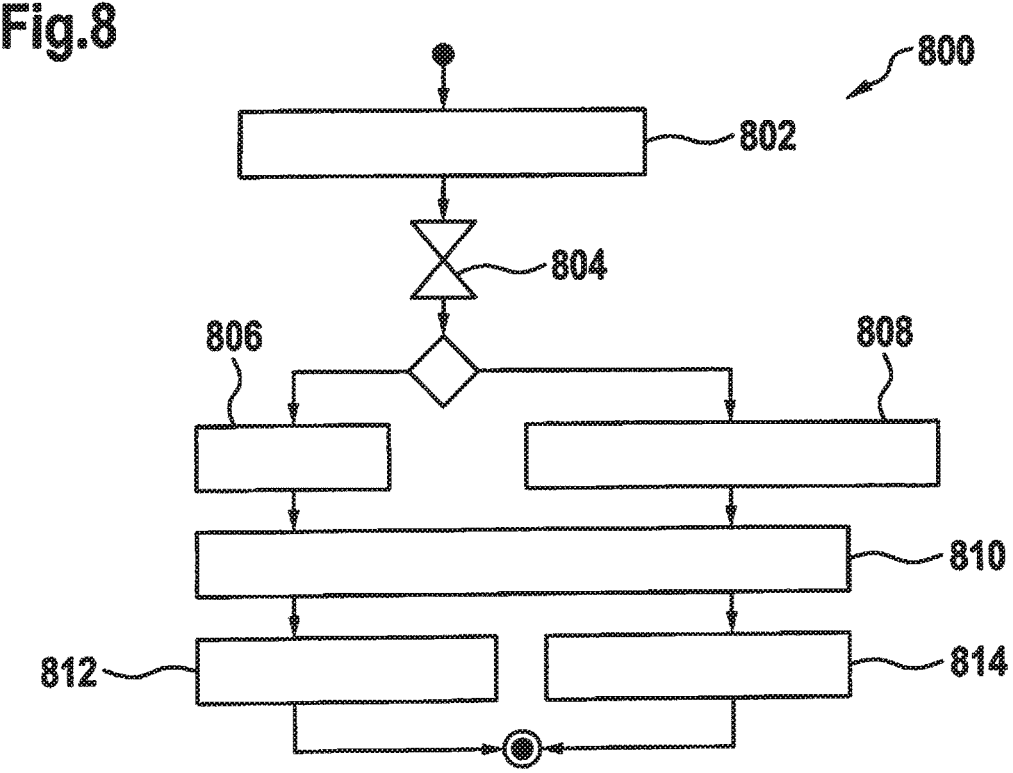
FIG. 8 shows a flow diagram of a method according to an exemplary embodiment.

FIG. 8 shows a flow diagram of a method 800 according to an exemplary embodiment. For example, method 800 may be carried out using a device as described in the previous text with the aid of FIGS. 1 through 7.

In the process, the device emits a readout message as readout signal in a step 802, and in a step 804 waits for a response from the RFID transponder, which represents a measuring point in the vehicle passenger compartment. If the device receives a response from the RFID transponder, then it is inferred in a step 806 that the measuring point is located within the receiving range. If the device receives no response from the RFID transponder, on the other hand, then it is assumed in a step 808 that the measuring point is obscured. Depending on whether or not a response was received, the measuring results are given a different interpretation in a step 810. For example, here it is determined that the vehicle passenger is sitting on the measuring point if no response was received, or it is determined that the belt was pulled out of the mounting mechanism if a response has been received.

A system adaptation then takes place in a step 812, for instance as a function of the interpretation as to whether the vehicle passenger is an adult or a child. For example, in step 812, if a child is detected on a passenger seat, an airbag triggering may be suppressed on the passenger seat. In addition or as an alternative, a warning is output to a vehicle passenger in a step 814, e.g., a warning that a seatbelt must be used if an occupied seat is detected and a seatbelt that has not been pulled out.

Step 810 may also encompass a plausibilization sub-step, e.g., if a response is received from an RFID transponder placed inside a seatbelt buckle, and no response is received from an RFID transponder placed on the associated seatbelt. For example, this is the case when the vehicle passenger is strapped in incorrectly, the RFID transponder placed in the seatbelt is defective, or if some other error has occurred, for instance because of a metal part having a large surface that obscures the seatbelt in the region of the RFID transponder. In order to reduce errors, the measuring is cyclically repeated in order to measure further information, such as a seating position via the change in the pullout length of the seatbelt, for example.

Optionally, a measurement during the opening or closing of a door lock is utilized for carrying out a diagnosis of the system. In another exemplary embodiment, the energy of the response signal returned by the RFID transponder is analyzed. This makes it possible to recognize partial obscurations, for example, or to carry out a more accurate classification because depending on the material and the thickness of the material obscuring the RFID transponder, the electromagnetic waves of the response signal are damped to different degrees. This makes it easy to distinguish between an object and a person, for example.

According to another exemplary embodiment, a reception of a response signal below a certain receiving power is considered a non-reception of the response signal. In this way it is possible to count dampings of insufficient magnitude as an obscuration. In a more detailed evaluation, different thresholds are used individually for each RFID transponder and thus, for different positions of the measuring points in the vehicle passenger compartment.

Figure 9:
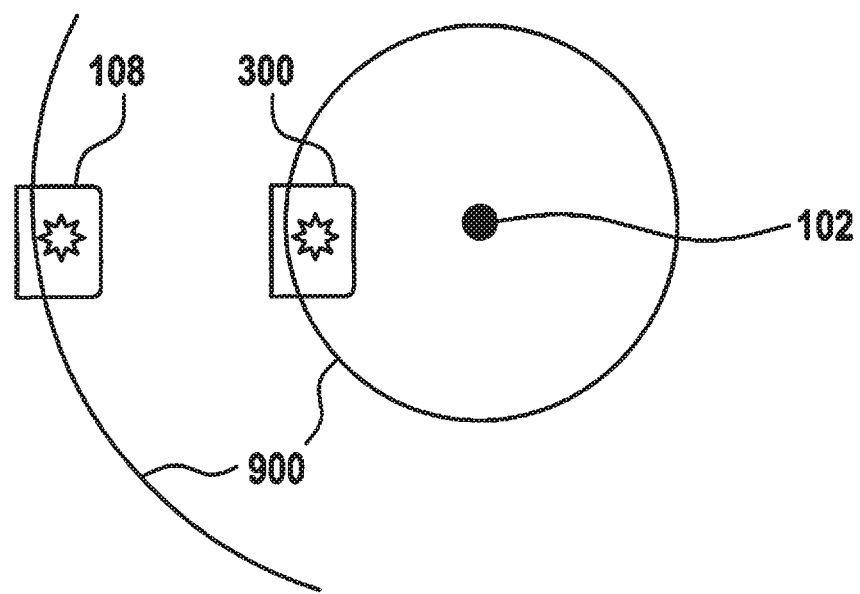
FIG. 9 a schematic representation of a readout radius of a device according to an exemplary embodiment.

FIG. 9 shows a schematic illustration of a readout radius 900 of a device 102 according to an exemplary embodiment, e.g., a device described in the previous text with the aid of FIGS. 1 through 8. Readout radius 900 is adapted as a function of a desired readout position. Also shown are the two RFID transponders 108, 300. By way of example, additional RFID transponder 300 is integrated into a front seat, and RFID transponder 108 is integrated into a rear seat of the vehicle that is situated opposite from the front seat. Device 102 serving as transmit and receive unit is disposed across from the front seat.

Figure 10:
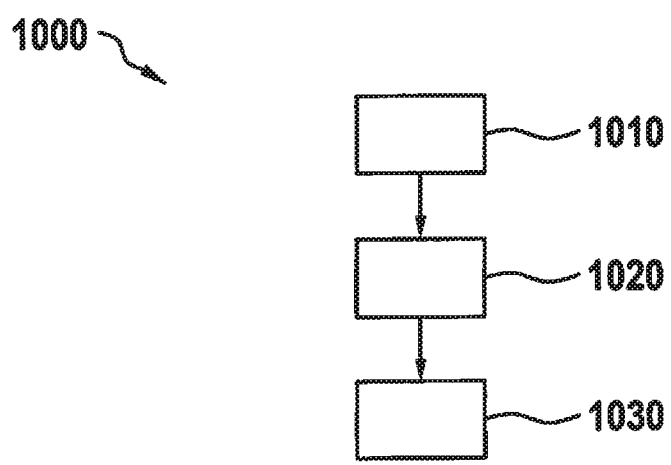
FIG. 10 shows a flow diagram of a method according to an exemplary embodiment.

FIG. 10 shows a flow diagram of a method 1000 according to an exemplary embodiment. Method 1000 for monitoring a vehicle passenger compartment of a vehicle may be carried out in conjunction with a device as described in the preceding text with the aid of FIGS. 1 through 9. In a step 1010, the readout signal for reading out the RFID transponder is emitted. In a step 1020, the response signal from the RFID transponder in response to the emitting in step 1010 is measured so as to obtain a measured value that represents the response signal. Finally, in a step 1030, the degree of obscuration representing the obscuration of the RFID transponder is ascertained with the aid of the measured value.

According to a particularly advantageous exemplary embodiment, the degree of obscuration is able to be interpreted, whereupon a reaction of the vehicle or a system of the vehicle may then be adapted or modified.

In the following text, different exemplary embodiments of the approach introduced here are described once again in other words and with the aid of FIGS. 1 through 10.

According to an exemplary embodiment, RFID transponder 108 is secured in a seat in close proximity to a seating surface. Device 102 analyzes the communications status in order to detect a seat occupancy. If RFID transponder 108 is obscured by vehicle passenger 104 seated thereon, then the communication between device 102 and RFID transponder 108 is interrupted because vehicle passenger 104 is composed largely of water, which dampens the communication. Using multiple RFID transponders makes it possible to increase the accuracy of the evaluation without significantly increasing the computational outlay.

According to another exemplary embodiment, RFID transponder 108 is integrated into seatbelt 106. This makes it possible to detect whether or not seatbelt 106 is used correctly. For example, if seatbelt 106 is used correctly, then RFID transponder 108 lies on the chest of vehicle passenger 104, as illustrated in FIG. 1, which means that a communication with device 102 is possible.

If seatbelt 106 is not pulled out, then RFID transponder 108 is situated behind a vehicle compartment trim panel 200, for example, and the communication is interrupted. If passenger 104 is strapped in incorrectly and seatbelt 106 runs along the back, e.g., when passenger 104 leaves seatbelt 106 strapped in at all times and then sits on top of it, passenger 104 dampens or interrupts the communication between device 102 and RFID transponder 108, which is able to be analyzed. Optionally, a communications-damping insert, such as a thin metal foil, is integrated into the rear part of the seat for this purpose.

According to a further exemplary embodiment, a plurality of RFID transponders 108, 300 are integrated into seatbelt 106. Device 102 ascertains a rough pullout length of the seatbelt by analyzing a particular obscuration of the RFID transponder, for instance. The pullout length of the seatbelt may then be used to distinguish between children and adults, for example.

According to another exemplary embodiment, a plurality of RFID transponders 108, 300 are integrated into the seat and placed at different height levels. Depending on the level, they may then be obscured by vehicle passenger 104. By analyzing a particular obscuration of the RFID transponders, device 102 ascertains a rough size of the passenger, and the size of the passenger may then be used to distinguish between children and adults, for example.

According to a further exemplary embodiment, device 102 ascertains a temporary seatbelt pullout length by analyzing a change in the communications possibility over time. In the process, a minimum pullout length is used for the classification of the person, while a current visibility of the RFID transponders is exploited in order to estimate the seatbelt pullout length and consequently, to estimate seatbelt slack as well as a rough position.

If device 102 ascertains a large seatbelt pullout length, then a seating pose of vehicle passenger 104 that deviates from a normal pose may be inferred, for example. Accordingly, vehicle passenger 104 is made aware of this, for example via warning signal 744, such as haptically by way of seatbelt 106.

As an option, a plausibilization of the seatbelt pullout length is carried out in that a further read device is disposed on another side of passenger compartment trim panel 200, for example. If a communication with the RFID transponder is not possible either on one or the other side of passenger compartment trim panel 200, then the RFID transponder may possibly be defective. According to another exemplary embodiment, the size of vehicle passenger 104, which is ascertained on the basis of the seatbelt pullout length, for example, is plausibilized with the aid of additional RFID transponders. For this purpose, RFID transponders are mounted at different height levels in the seat, which may be obscured by vehicle passenger 104, depending on the height.

According to a further exemplary embodiment, the seatbelt status is detected based on the same obscuration principle.

The exploitation of RFID technology offers the advantage of simplifying the integration of sensors into the vehicle. The installation of cables may be dispensed with since the communication takes place via a central read device in the form of device 102.

The approach is able to be scaled since the RFID transponders are easy to integrate. The RFID technology has been shown to be technically mature and is suitable for the large-scale, rapid evaluation of RFID transponders.

The detection principle may be summarized in the following way. To begin with, device 102 transmits a pulse 110 for the readout. RFID transponder 108 withdraws energy from pulse 110 and thereby transmits its unequivocal ID, for example. If device 102 receives the ID, then this means that RFID transponder 108 is located in vehicle passenger compartment 100 and is not obscured. On the other hand, if RFID transponder 108 is obscured, then the obscuring material dampens pulse 110 to such an extent that not enough energy arrives at RFID transponder 108 and it is unable to respond. If sufficient energy arrives for a response, then it may be the case that response signal 112, which is also damped, is so weak that device 102 is no longer able to distinguish it from noise.

Electromagnetic waves propagate in spherical form in a homogeneous medium, which is why the received energy depends on the square of the distance. If some other material is situated between the transmitter and receiver, then the wave is refracted, diffracted (with light, for example) or, above all, damped in a different manner. For instance, radio waves are damped by water and therefore also by people.

For instance, placing RFID transponder 108 in seatbelt 106 has the advantage that a triangulation for the purpose of determining the position of RFID transponder 108 in vehicle passenger compartment 100 may be dispensed with. It is solely analyzed whether or not RFID transponder 108 is obscured or in other words, whether or not it is able to signal its presence. Having knowledge of the position of RFID transponder 108 in seatbelt 106 makes it possible to determine the pullout length of the seatbelt based on the emergence or disappearance of RFID transponder 108. A complex triangulation is not necessary, which makes the system particularly robust and inexpensive.

An additional read device, which is disposed behind passenger compartment trim panel 200, allows for a plausibilization. If RFID transponder 108 is detected neither by the read device located in vehicle passenger compartment 100 nor by the read device disposed behind passenger compartment trim panel 200, then it may be concluded that RFID transponder 108 is in all likelihood defective. A diagnosis of the system is possible in this manner.

When RFID transponder 108 is placed in seatbelt buckle 500 or in seatbelt tab 502, it is possible to centrally detect which seatbelt tabs are engaged, i.e. which tabs are not visible to device 102; this is possible by ascertaining the visible tabs and comparing them to an expected or to an installed number of seatbelt tabs. In this way it is possible to detect whether or not a seatbelt tab is engaged without carrying out an additional measurement on seatbelt buckle 500.

Safety functions are realizable by installing the RFID transponders at different locations in the vehicle. For example, by integrating an RFID transponder in the seat, it is possible to use the obscuration information to identify whether or not a point is obscured in the vehicle, and a safety function is able to be adapted correspondingly.

The following text describes different possibilities for adapting readout signal 110, also referred to as a read pulse, to environmental conditions of an individual RFID transponder, also referred to as RFID chip, according to the approach described here. For example, a transmission power of device 102 for ascertaining degree of obscuration 720 is adapted. Additionally or alternatively, the transmission power is adapted to an expected position and to a reception strength of the RFID transponders to be read out.

Large distances require a relatively high transmission power in order to be able to detect an RFID chip that is not obscured. As a rule, the transmitter outputs a uniform transmit pulse and evaluates the received signal. RFID chips that are located in the vicinity of the transmitter thereby receive a lot of energy that may be returned again accordingly, which means that an obscuration is not always able to be detected in a reliable manner (receive signal is received).

In the case of partial obscurations, the energy is partially absorbed and partially returned again, which is why there is a very small decision window during which a decision may be made as to whether or not an obscuration is present. Partial obscurations are not always able to be reliably identified as such.

According to an exemplary embodiment, device 102 emits various read pulses of different strengths. In the case of a weaker read pulse, some RFID chips do not receive enough energy to allow them to respond and they are therefore detected as obscured by device 102.

For example, device 102 selects a certain RFID chip in order to ascertain whether or not it is obscured. Because of the spherical propagation of the electromagnetic waves of the read pulse, the known or expected position of the RFID chip may be utilized to adjust the transmission energy in such a way that the energy, which is just barely still received without obscuration, is exceeded. By adapting the read pulse to the distance, there is no need for finding a compromise in the transmission power: a lower transmission power is used for closer RFID chips, and a greater transmission power is used for more remote RFID chips. The transmission power is adapted in such a way that in case of an obscuration, response signal 112 is always damped to such an extent that it is subsumed by noise and/or lies below a reference threshold.

According to a further exemplary embodiment, degree of obscuration 720 is ascertained by adapting the transmission power. If the RFID chip does not respond at a standard transmission power that is optimized for said RFID chip, i.e., if the RFID chip is considered to be obscured, then the transmission power will be successively increased until response signal 112 is received. The strength of the damping makes it possible to infer degree of obscuration 720 if a standard damping measure is used as the starting point.

Conversely, if response signal 112 is received immediately, the transmission power is successively reduced in order to be able to ascertain the damping even at weak signal shadowing. A location that is detected as not obscured at a strong read pulse (response is received) may be detected as obscured at a weaker pulse (response too weak). This may be the case, for instance, if the RFID sensor in the seat surface is partially obscured by a leg of vehicle passenger 104. In another case, the size of vehicle passenger 104 is able to be detected very precisely if vehicle passenger 104 is exactly as tall as the installation height of the RFID chip. The RFID chip is then partially obscured, which is able to be evaluated by an adapted read pulse, and the size is able to be inferred directly. A detailed size measurement is possible with the aid of a band of RFID chips, for example.

The use of special and expensive materials for signal damping may be dispensed with by using a read pulse that is adapted to the conditions of the individual RFID chip. A similar behavior is able to be obtained by adapting the read pulse.

According to another exemplary embodiment, device 102 measures a series of different transmission powers and logs the receipt of corresponding signal responses. The damping behavior is evaluated in detail by analyzing the different signal strengths, e.g., a receiving power versus a transmission power, and compared to an expected damping behavior given an obscuration. If the signal deviates excessively, in particular due to damping by an obscuring person, then an obscuration may be assumed.

The adaptation of the read pulse may advantageously be utilized for seats if no special material is integrated into the seats for shielding purposes. A read pulse of normal strength could penetrate the seat material from behind and respond to the read device from the front regardless of the occupancy. Because of the possibility of adapting the read pulse, a weaker pulse may be used for evaluating the seat occupancy. The readout of the RFID chip through the seat material is no longer possible. A readout at a weak pulse is possible only in the case of an unobscured seat from the front. The response at a strong pulse is ignored. This makes it possible to ascertain an obscuration as a function of the position and the material.

Through the use of a very strong read pulse, all RFID chips may be excited to answers. For example, this also allows for a communication with RFID chips that are obscured as a rule, for instance because they are disposed behind a seatbelt cover or behind a passenger compartment trim panel; it may also be measured whether or not they are even still able to respond or are defective. When the seatbelt is pulled out, then the RFID chips are able to respond more easily, which is why a lower transmission power will then be used during the polling, for example. The optimal transmission power is adjusted precisely in such a way that the material of the seatbelt cover at the edge absorbs just enough to make it impossible for the RFID chips to respond any longer. By adapting the transmission power, it is therefore also possible to dispense with special materials in the cover of the seatbelt.

According to another exemplary embodiment, when the vehicle is empty such as when it has been locked and parked for a certain period of time, read pulses of different strengths are emitted. This allows the system to be calibrated and an ideal read pulse to be ascertained for each RFID chip, for example. By using a very strong read pulse, it is possible to even detect even RFID chips in the seatbelt behind passenger compartment trim panel 200, thereby allowing a diagnosis of the RFID chips to be undertaken. An additional read device behind passenger compartment trim panel 200 is able to be dispensed with in this manner.

A more precise evaluation of the degree of obscuration by adapting the read pulse may be advantageous inasmuch as the read pulse is adaptable to the different RFID chips, to degrees of obscuration and to positions within the vehicle.

Using two receive units and/or two transmit units at different locations allows for an even more precise determination of the obscurations by comparing the dampings from different directions with one another. For example, device 102 ascertains on which side of an RFID chip a damping element is located.

FIG. 9 shows the adaptation of readout radius 900, which corresponds to a transmission energy, at a desired RFID chip. If a person is located on the seat into which the RFID chip is integrated, then the response signal that is usually just barely receivable is damped too strongly so that no response will be received any longer. In a fixed adjustment of the transmission energy, the closer RFID chip 300 would always respond on account of the high energy in the signal.

According to a further exemplary embodiment, the transmission power is adapted not only to the position of the desired RFID chip but also to the damping of other RFID chips or to an occupancy situation in the vehicle. For example, the transmit and receive units poll the obscuration or occupancy of the RFID chips in succession. Whenever an RFID chip fails to respond, i.e., is obscured, this will be taken into account for the evaluation of the following RFID chips. The obscuration of the closer RFID chip will also dampen the response signal of the subsequent RFID chip, which is considered in the obscuration evaluation, and thus in the selection of the readout signal.

In FIG. 9, for example, a passenger on the front seat would dampen the readout signal to the back seat. By measuring the damping of the first obscuration, either directly in the signal or by trying out different transmission powers, for instance, the measuring of the rear seat is adapted via a stronger readout signal.

If an exemplary embodiment includes an "and/or" linkage between a first feature and a second feature, then this should be read to mean that the exemplary embodiment according to one specific embodiment includes both the first feature and the second feature, and according to another specific embodiment, that it includes either only the first feature or only the second feature.

What is claimed is:

1. A method for monitoring a vehicle passenger compartment of a vehicle, the vehicle passenger compartment including at least one RFID transponder, the method comprising:

emitting a readout signal for reading out the RFID transponder;

measuring a response signal of the RFID transponder in response to the emitting to obtain a measured value; and ascertaining a degree of obscuration that represents an obscuration of the RFID transponder using the measured value to monitor the vehicle passenger compartment, wherein in the emitting step, a transmission power for emitting the readout signal is varied at least one of: (i) as a function of a position of the RFID transponder in the vehicle passenger compartment, and (ii) as a function of damping of the readout signal and/or the response signal.

2. The method as recited in claim 1, wherein in the ascertaining step, the degree of obscuration is at least one of: (i) greater than zero when the measured value represents an absence of the response signal, and (ii) equal to zero when the measured value represents a presence of the response signal.

3. The method as recited in claim 1, further comprising: comparing the measured value with a reference value, and, in the ascertaining step, the degree of obscuration is ascertained as a function of a result of the comparison.

4. The method as recited in claim 1, further comprising: generating a control signal for controlling the vehicle, wherein at least one of a protection device and a warning signal for the output of a warning in the vehicle passenger compartment uses the degree of obscuration.

5. The method as recited in claim 1, further comprising: ascertaining, using the degree of obscuration, at least one of: (i) a seat occupancy in the vehicle passenger compartment of the vehicle, (ii) a size of a vehicle passenger of the vehicle, (iii) a pullout length of a seatbelt of the vehicle, and (iv) a status of a seatbelt buckle of a seatbelt of the vehicle.

6. The method as recited in claim 5, wherein in the emitting step, at least one further readout signal is emitted for reading out at least one further RFID transponder in the vehicle passenger compartment, and in the measuring step and in response to the emitting of the further readout signal, at least one further response signal of the further RFID transponder is measured in order to obtain at least one additional measured value, and in the ascertaining step, an additional degree of obscuration, which represents an obscuration of the additional RFID transponder, is ascertained using the further measured value, and in the determining step, at least one of the seat occupancy, the size of the vehicle passenger, the seatbelt pullout length, and the status of the seatbelt buckle, is/are furthermore determined with the aid of the further degree of obscuration.

7. The method as recited in claim 6, further comprising: plausibilizing the measured value using the further measured value.

8. A device including units designed to monitor a vehicle passenger compartment of a vehicle, the vehicle passenger compartment including at least one RFID transponder, and the device configured to:
    emit a readout signal for reading out the RFID transponder;
    measure a response signal of the RFID transponder in response to the emitting to obtain a measured value; and
    ascertain a degree of obscuration that represents an obscuration of the RFID transponder using the measured value to monitor the vehicle passenger compartment,
wherein in the emitting, a transmission power for emitting the readout signal is varied at least one of: (i) as a function of a position of the RFID transponder in the vehicle passenger compartment, and (ii) as a function of damping of the readout signal and/or the response signal.

9. A non-transitory machine-readable storage medium on which is stored a computer program for monitoring a vehicle passenger compartment of a vehicle, the vehicle passenger compartment including at least one RFID transponder, the computer program, when executed by a computer, causing the computer to perform:
    emitting a readout signal for reading out the RFID transponder;
    measuring a response signal of the RFID transponder in response to the emitting to obtain a measured value; and
    ascertaining a degree of obscuration that represents an obscuration of the RFID transponder using the measured value to monitor the vehicle passenger compartment,
wherein in the emitting, a transmission power for emitting the readout signal is varied at least one of: (i) as a function of a position of the RFID transponder in the vehicle passenger compartment, and (ii) as a function of damping of the readout signal and/or the response signal.

* * * * *